(12) United States Patent
McKenney

(10) Patent No.: US 9,081,803 B2
(45) Date of Patent: *Jul. 14, 2015

(54) PERFORMANCE OF RCU-BASED SEARCHES AND UPDATES OF CYCLIC DATA STRUCTURES

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/774,694

(22) Filed: Feb. 22, 2013

(65) Prior Publication Data

US 2014/0108366 A1    Apr. 17, 2014

Related U.S. Application Data

(63) Continuation of application No. 13/652,607, filed on Oct. 16, 2012, now Pat. No. 8,874,535.

(51) Int. Cl.
*G06F 17/30* (2006.01)
*G06F 9/48* (2006.01)

(52) U.S. Cl.
CPC ........ *G06F 17/30286* (2013.01); *G06F 9/4881* (2013.01); *G06F 17/3023* (2013.01)

(58) Field of Classification Search
CPC .......... G06F 13/3023; G06F 17/30286; G06F 17/30008; G06F 17/30309; G06F 17/3023; G06F 17/3007; G06F 17/30174; G06F 3/0665; G06F 3/065; G06F 21/55; G06F 12/00; G06F 9/4881; G06F 9/4843; G06F 12/0891; G06F 12/0813; G06F 12/0804

USPC .......... 707/695, E17.007, E17.005, 601, 649, 707/737, 827, 822, E17.01, E17.032, 707/E17.044, 795, 802, 995, 791, 807, 823; 711/147, 148, 141, 135, 221, E12.06, 711/E12.017, 152, 162, 156, 154, 151, 711/170.162; 718/102, 107, 100, 103, 104; 709/203, 227, 223

See application file for complete search history.

(56) References Cited

U.S. PATENT DOCUMENTS 5,442,758 A * 8/1995 Slingwine et al. ............ 717/147
5,608,893 A    3/1997 Slingwine et al.

(Continued)

OTHER PUBLICATIONS

"What is RCU, Fundamentally?" Paul McKenney and Jonathan Walpole, LWN.net (http://lwn.net/Articles/262464/), Dec. 17, 2007. p. 1-17 (Published in: Linux Weekly News (LWN.net)—Publication Date: Dec. 2007.*

(Continued)

Primary Examiner — Anh Ly
(74) Attorney, Agent, or Firm — Walter W. Duft

(57) ABSTRACT

A technique for improving the performance of RCU-based searches and updates to a shared data element group where readers must see consistent data with respect to the group as a whole. An updater creates one or more new group data elements and assigns each element a new generation number that is different than a global generation number associated with the data element group, allowing readers to track update versions. The updater links the new data elements into the data element group and then updates the global generation number so that referential integrity is maintained. This is done using a generation number element that is referenced by a header pointer for the data element group, and which in turn references or forms part of one of the data elements. After a grace period has elapsed, the any prior version of the generation number element may be freed.

21 Claims, 7 Drawing Sheets

(56) References Cited

U.S. PATENT DOCUMENTS

| | | | |
|---|---|---|---|
| 5,727,209 A | 3/1998 | Slingwine et al. | |
| 6,021,446 A * | 2/2000 | Gentry, Jr. | 719/315 |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | McKenney | |
| 7,287,135 B2 | 10/2007 | McKenney et al. | |
| 7,349,926 B2 | 3/2008 | McKenney et al. | |
| 7,353,346 B2 | 4/2008 | McKenney et al. | |
| 7,395,263 B2 | 7/2008 | McKenney | |
| 7,395,383 B2 | 7/2008 | McKenney | |
| 7,426,511 B2 * | 9/2008 | McKenney | 711/151 |
| 7,454,581 B2 | 11/2008 | McKenney et al. | |
| 7,462,511 B2 * | 12/2008 | Yamagata | 438/118 |
| 7,472,228 B2 | 12/2008 | McKenney et al. | |
| 7,653,791 B2 | 1/2010 | McKenney | |
| 7,668,851 B2 | 2/2010 | Triplett | |
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 * | 10/2010 | McKenney | 707/704 |
| 7,818,306 B2 | 10/2010 | McKenney et al. | |
| 7,873,612 B2 * | 1/2011 | McKenney et al. | 707/704 |
| 7,904,436 B2 | 3/2011 | McKenney | |
| 7,934,062 B2 | 4/2011 | McKenney et al. | |
| 7,953,708 B2 | 5/2011 | McKenney et al. | |
| 7,953,778 B2 * | 5/2011 | McKenney et al. | 707/791 |
| 7,987,166 B2 | 7/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 8,180,971 B2 * | 5/2012 | Scott et al. | 711/141 |
| 8,185,704 B2 | 5/2012 | McKenney et al. | |
| 8,195,893 B2 | 6/2012 | Triplett | |
| 2005/0149634 A1 * | 7/2005 | McKenney | 709/248 |
| 2005/0198030 A1 * | 9/2005 | McKenney | 707/8 |
| 2005/0234933 A1 * | 10/2005 | Lin | 707/100 |
| 2006/0100996 A1 * | 5/2006 | McKenney et al. | 707/3 |
| 2006/0112121 A1 * | 5/2006 | McKenney et al. | 707/101 |
| 2006/0265373 A1 | 11/2006 | McKenney et al. | |
| 2007/0061372 A1 * | 3/2007 | Appavoo et al. | 707/200 |
| 2007/0183418 A1 * | 8/2007 | Riddoch et al. | 370/389 |
| 2008/0033952 A1 * | 2/2008 | McKenney et al. | 707/8 |
| 2008/0082532 A1 | 4/2008 | McKenney | |
| 2008/0177742 A1 * | 7/2008 | McKenney | 707/8 |
| 2008/0177748 A1 * | 7/2008 | Rondot | 707/10 |
| 2008/0313238 A1 * | 12/2008 | McKenney et al. | 707/200 |
| 2009/0006403 A1 | 1/2009 | McKenney | |
| 2009/0077080 A1 | 3/2009 | McKenney | |
| 2009/0254764 A1 * | 10/2009 | McKenney et al. | 713/300 |
| 2009/0292705 A1 * | 11/2009 | McKenney et al. | 707/8 |
| 2009/0320030 A1 | 12/2009 | Ogasawara | |
| 2011/0055630 A1 | 3/2011 | McKenney et al. | |
| 2011/0099335 A1 * | 4/2011 | Scott et al. | 711/141 |
| 2011/0283082 A1 | 11/2011 | McKenney et al. | |
| 2012/0047140 A1 | 2/2012 | McKenney et al. | |
| 2012/0079301 A1 | 3/2012 | McKenney | |
| 2012/0113987 A1 * | 5/2012 | Riddoch et al. | 370/390 |
| 2012/0144129 A1 | 6/2012 | McKenney | |
| 2012/0324461 A1 * | 12/2012 | McKenney | 718/103 |
| 2014/0108365 A1 * | 4/2014 | McKenney | 707/695 |
| 2014/0108366 A1 * | 4/2014 | McKenney | 707/695 |

OTHER PUBLICATIONS

"RCU vs. locking performance on different CPUs"—PE McKenney—linux. conf. au, Adelaide, Australia, 2004—rdrop.com—pp. 1-18.*

J. Seigh, "RCU + SME for preemptive kernel/user threads," Linux Kernel Mailing List, May 9, 2005, 2 pages.

M. Michael, "Hazard Pointers: Safe Memory Reclamation for Lock-Free Objects" IEEE Transactions on Parallel and Distributed Systems. Jun. 2004, vol. 15, No. 6, pp. 491-504.

D. Sarma et al., "Making RCU Safe for Deep Sub-Milisecond Response Realtime Applications," 2004 USENIX (UseLinux track) Jun. 2004, 9 pages.

P. McKenney, "Rod vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 32 pages.

H. Lindar et al., "Scalability of the Directory Entry Cache," 2002 Ottawa Linux Symposium, Jun. 26, 2002, pp. 289-300.

P. McKenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux", 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Look-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

McKenney, "Seven real-time Linux approaches (Part C)", LinuxDevices.com, Jun. 7, 2005, 13 pages.

P. McKenney, "RCU and CONFIG_PREEMPT_RT progress," Linux Kernel Mailing List, May, 9, 2005, 2 pages.

O. Nesterov, QRCU: 'Quick' SRCU Implementation, Linux Kernel Mailing List, Dec. 1, 2005, 3 pages.

P. McKenney, "Sleepable RCU", LWN.net, Oct. 9, 2006, 10 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al., "Concurrency Control in Advanced Database Operations," Jan. 1994, 83 pages.

P. McKenney "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net, Oct. 8, 2007, 27 pages.

P. McKenney, "Integrating and Validating dynticks and Preemptible RCU," LWN.net, Apr. 22, 2008, 19 pages.

P. McKenney "Hierarchical RCU," LWN.net, Nov. 4, 2008, 19 pages.

P. McKenney, "Is Parallel Programming Hard, and, if So, What Can You Do About It", Mar. 8, 2009, 146 pages.

P. McKenney, "Priority-Boosting RCU Read-Side Critical Sections," LWN.net, Feb. 5, 2007, 15 pages.

(56) References Cited

OTHER PUBLICATIONS

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

D. Guniguntala et al., "The read-copy-update mechanism for supporting real-time applications on shared-memory multiprocessor systems with Linux", IBM Systems Journal vol. 47 No. 2, pp. 221-236.

P. McKenney, "Introducing Technology Into Linux", 2008 Linux Developer Symposium, China, 2008, 47 pages.

P. McKenney, "Simplicity Through Optimization", linux.conf.au, Jan. 2010, 109 pages.

P. McKenney, "Deterministic Synchronization in Multicore Systems: the Role of RCU", Aug. 18, 2009, pp. 1-9.

P. McKenney, "RCU cleanups and simplified preemptable RCU", LKML.org, Jul. 23, 2009, 1 page.

P. McKenney, "Expedited "big hammer" RCU grace periods", LKML.org, Jun. 25, 2009, 2 pages.

P. McKenney, "RCU: The Bloatwatch Edition", LWN.net, Mar. 17, 2009, 9 pages.

M. Desnoyers, "Low-Impact Operating System Tracing", University of Montreal, PhD Thesis, Dec. 2009, 233 pages.

P. McKenney. "Using a Malicious User-Level RCU to Torture RCU-Based Algorithms", linux.conf.au, Jan. 2009, 51 pages.

P. McKenney et al., "Introducing Technology Into the Linux Kernel: A Case Study", Operating Systems Review, Jul. 2008, 16 pages.

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

P. Zijlstra, "[PATCH] slab: document SLAB_DESTROY_BY_RCU", LKML.org, Nov. 13, 2008, 1 page.

A. Arcangeli et al., "Using Read-Copy-Update Techniques for System V IPC in the Linux 2.5 Kernel," 2003 FREENIX, Jun. 14, 2003, 13 pages.

P. McKenney, "The RCU API, 2010 Edition" LWN.net, Dec. 8, 2010, 11 pages.

M. Desnoyers et al., "User-Level Implementations of Read-Copy Update", IEEE Transactions on Parallel and Distributed Systems, vol. x, No. y, Jul. 2009, pp. 1-14.

J. Triplett, "Scalable Concurrent Hash Tables via Relativistic Programming", ACM-SIGOPS Operating System Review vol. 44, Issue 3, Jul. 2010, 14 pages.

T. Gleixner, High Resolution Timers / Dynamic Tics—V2, LWN.net, Oct. 31, 2006, 5 pages.

Anonymous, "Avoiding unnecessary makeups when waking up CPUs at the completion of a grace period", http://priorartdatabase.com/IPCOM/00216206D, Mar. 25, 2012, 4 pages.

IBM, "RCU and Sometimes Read Mostly Data Structures", http://www.ip.com/pubview/IPCOM000176300D, Nov. 11, 2008, 2 pages.

* cited by examiner

PERFORMANCE OF RCU-BASED SEARCHES AND UPDATES OF CYCLIC DATA STRUCTURES

This application is a continuation under 35 U.S.C. 120 of application Ser. No. 13/652,607, filed Oct. 16, 2012, entitled "Improving Performance of RCU-Based Searches And Updates Of Cyclic Data Structures."

BACKGROUND

1. Field

The present invention relates to computer systems and methods in which data resources are shared among concurrent data consumers while preserving data integrity and consistency relative to each consumer. More particularly, the invention concerns improvements to a mutual exclusion mechanism known as "read-copy update," in which lock-free data read operations run concurrently with data update operations.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. For example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is available for the benefit of other read operations that access the data following the update. These other read operations will never see the stale data and so the updater does not need to be concerned with them. However, the updater does need to avoid prematurely removing the stale data being referenced by the first group of read operations. Thus, in the second (deferred update) phase, the old data state is only removed following a "grace period" that is long enough to ensure that the first group of read operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This may be done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization (NBS) or a designated update thread could be used to serialize data updates. Data element B is partially maintained in the linked list by preserving its pointer to element C. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. The pointer from B to C is retained. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes (or threads within a process) having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU running non-preemptible code (as can other operations that will not be listed here). In some read-copy update implementations adapted for preemptible readers, all read operations that are outside of an RCU read-side critical section are quiescent states.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,442,758, entitled "System And Method For Achieving Reduced Overhead Mutual-Exclusion And Maintaining Coherency In A Multiprocessor System Utilizing Execution History And Thread Monitoring." Another commonly used technique is to have updaters block (wait) until a grace period has completed.

A number of variants of read-copy update have been used in different operating systems. However, all of these implementations make at least one of the following assumptions:

1) Stale data is permissible (for example, in read-copy update-protected routing tables).
2) Readers search the aggregate data structure in an acyclic manner, so that there is no possibility of a reading process seeing two different versions of the same data element during a single operation. This assumption also implies that, for data elements having multiple entry points, a given search starts with only one of these entry points.
3) There is no need for multiple data elements to be seen in a consistent aggregate state. Consistency is important only for a given data element (as, for example, the data structures used in the Linux 2.6 kernel's read-copy update-protected System V IPC (InterProcess Communication) mechanism).
4) If group consistency is important for a collection of data elements, read-copy update must be used in a manner that allows the group to be updated atomically so as to protect group integrity. As used herein, the term "atomic" signifies that the data update operation must complete with the guarantee that no other process will see inconsistent versions of the group data elements. For example, in the Linux 2.6 kernel, the directory-cache is protected by read-copy update, but per-entry locks are also used to ensure that updates to these entries and their associated inodes are in a coordinated consistent state when cache readers access the entries. Another approach would be to make a copy of the aggregate data structure (i.e., the entire collection of data elements), update the new copy, and then link the new copy in place of the old copy. However, this is extremely time consuming for large groups, and is particularly inefficient when only small changes are required.

Cyclic searches represent a situation where none of the foregoing assumptions underlying the use of read-copy update are in play. An example of a commonly used cyclic search is the traversal of a cyclic data structure whose elements are inter-linked in a manner that may result in a reader encountering the same element more than once during a single search. A data element group whose elements represent the states of a finite state machine would be considered such a data structure. If these data elements change dynamically, but infrequently, in comparison to the number of read traversals, then the use of read-copy update could be advantageous. However, it will be seen that:

1) Permitting stale data could result in a reader seeing an inconsistent, and possibly nonsensical, finite state machine.
2) Traversing a finite state machine is in general an inherently cyclic activity.
3) Each reader must see a finite state machine that is consistent as a whole—consistency of a particular state is not sufficient.
4) If the finite state machine is large, implementing atomic data element group updates by group copying will be infeasible.

Commonly owned U.S. Pat. Nos. 7,426,511 and 7,953,778, each naming applicant as an inventor, addresses the need to maintain group integrity in a shared data element group by assigning generation numbers to update operations involving the group. A reader that is searching the data element group can then identify any update whose generation number corresponds to a global generation number noted by the reader at the start of its search. This approach allows the readers to traverse the data element group while guaranteeing that those readers will see consistent data in the face of concurrent updates. However, the approach must account for the possibility of out-of-order memory references involving the generation number due to CPU and/or compiler optimizations. It is essential that readers always see the current global generation number as updated by the most recent updater as the readers begin their searches. Ensuring such synchronization requires either that:

1) Readers execute an explicit memory-barrier instruction after fetching the global generation number, but before traversing the data element group; or
2) Updaters wait for a grace period between updating the data element group and posting the updated global generation number (and updating any header pointers).

Both of these approaches are slow, motivating an improved approach that requires neither read-side memory barriers nor update-side grace periods on the critical read-side or update-side path.

SUMMARY

A method, system and computer program product are disclosed for improving the performance of RCU-based searches and updates to a shared data element group where readers must see consistent data with respect to the group as a whole. An updater may be invoked to create one or more new group data elements. Each new data element created by the updater is assigned a new generation number that is different than a global generation number associated with the data element group and which allows a reader of the data element group to determine whether the new data element is a correct version for the reader. The updater may perform update processing on the new data elements by (1) respectively establishing a first version link from each of the new data elements to a prior version thereof having a different generation number, (2) respectively establishing a second version link to each of the new data elements from its prior version, and (3) linking the new data elements into the data element group so that the new data elements are reachable by readers. The global generation number is updated so that referential integrity is maintained. This is done using a generation number element that is referenced by a header pointer for the data element group, and which in turn references or forms part of one of the data elements. After a grace period has elapsed, the prior version, the first version link and the second version link for each of the new data elements, together with any prior version of said generation number element, may be freed.

In one embodiment, the generation number element comprises a pointer that references one of the data elements and whose address comprises the global generation number. This generation number element may be allocated from a contiguous array of generation number elements.

In another embodiment, the generation number element comprises a data structure whose fields include a pointer that references one of the data elements and a variable storing the global generation number.

In another embodiment, the generation number element comprises one of the data elements implemented as a data structure whose fields include a variable storing the global generation number.

In another embodiment, the generation number element comprises a pointer-forwarding entity implemented as a data structure whose fields include a pointer reference to one of the data elements and a variable storing the global generation number.

In another embodiment, the updater may execute a memory barrier instruction after establishing the first version link, the second version link and the group links, and prior to updating the global generation number.

BRIEF DESCRIPTION OF THE DRAWINGS

The foregoing and other features and advantages of the invention will be apparent from the following more particular description of example embodiments of the invention, as illustrated in the accompanying Drawings, in which.

DETAILED DESCRIPTION OF EXAMPLE EMBODIMENTS

Figure 1A:
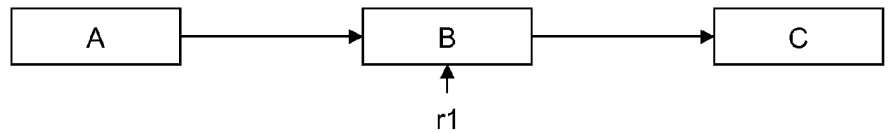
FIGS. 1A-1D are diagrammatic representations of a linked list of data elements undergoing a data element replacement according to a conventional read-copy update mechanism.
Figure 1B:
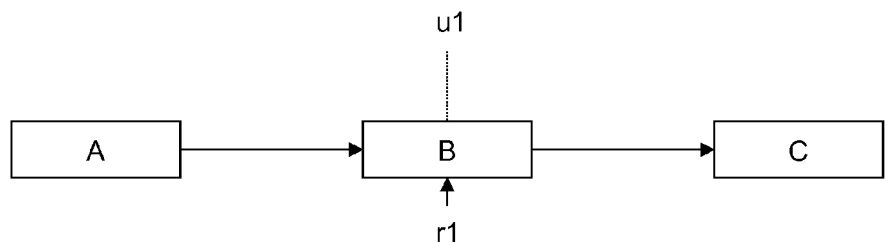
Figure 1C:
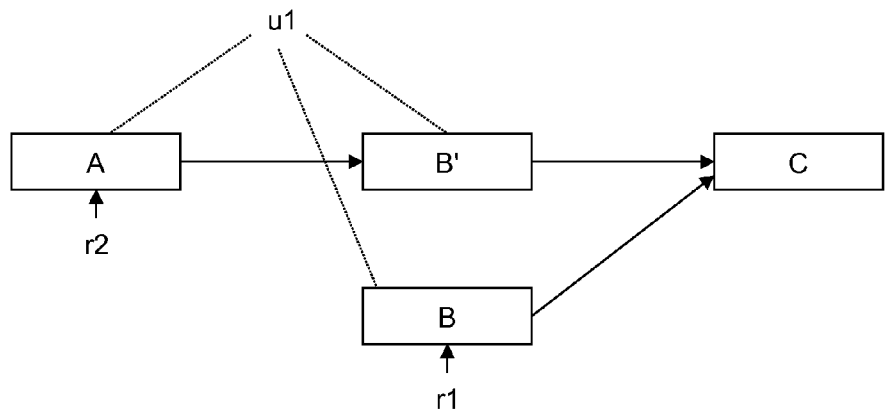
Figure 1D:
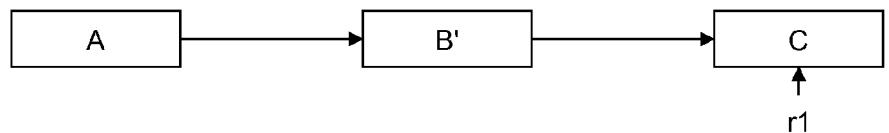
Figure 2A:
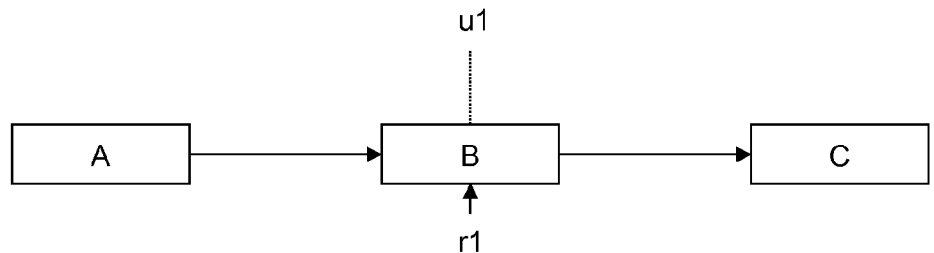
FIGS. 2A-2C are diagrammatic representations of a linked list of data elements undergoing a data element deletion according to a conventional read-copy update mechanism.
Figure 2B:
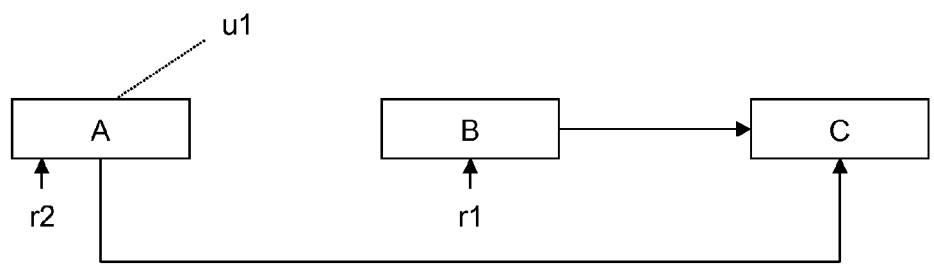
Figure 2C:
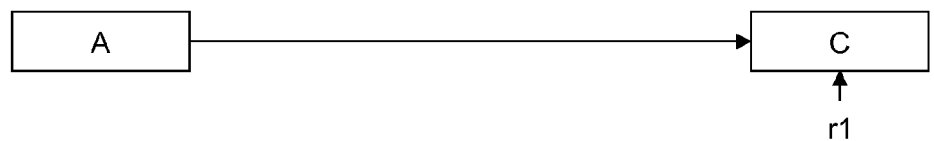
Figure 3:
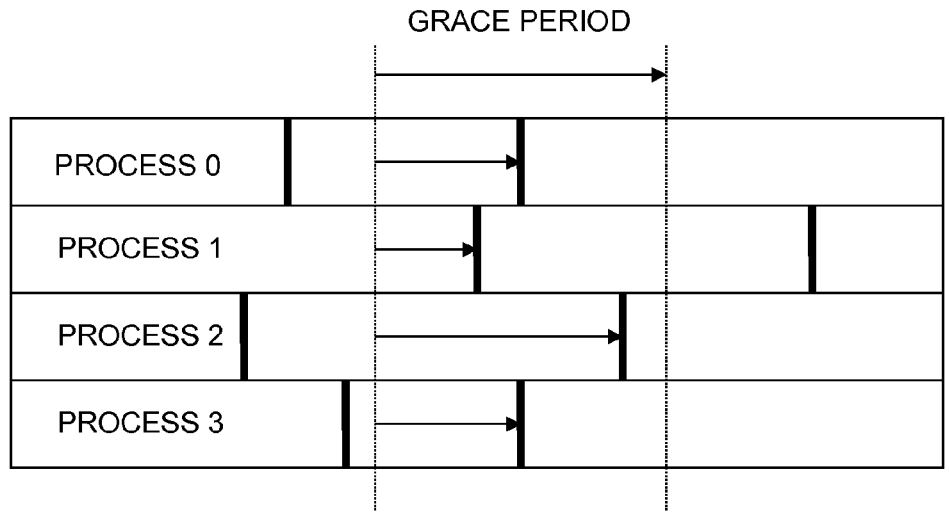
FIG. 3 is a flow diagram illustrating a grace period in which four processes pass through a quiescent state.
Figure 4:
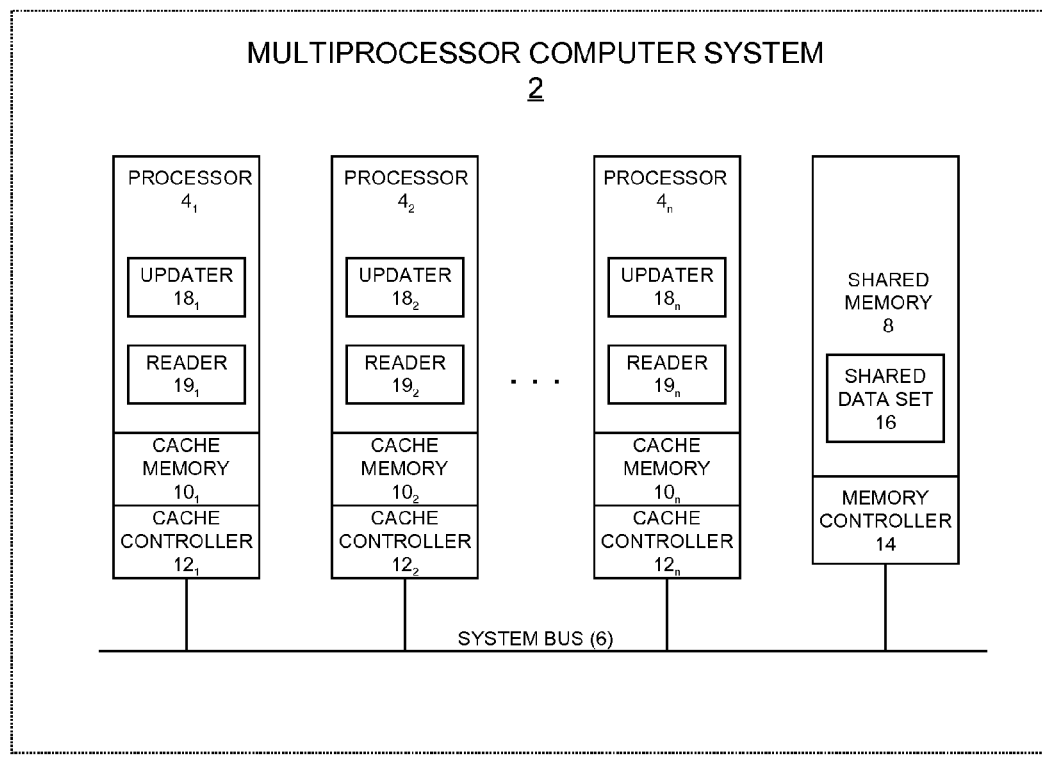
FIG. 4 is a functional block diagram showing an example multiprocessor computing system.

Turning now to the figures, wherein like reference numerals represent like elements in all of the several views, FIG. 4 illustrates an example computing environment in which the present invention may be implemented. In particular, a multiprocessor computer system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a multitasking operating system adapted for use in an SMP environment. In the alternative, a single processor computing environment could be used, as could a hardware multithreading environment, a multi-core environment and a NUMA (Non-Uniform Memory Access) environment, to name but a few. Furthermore, multiple multitasking operating systems might all run concurrently on the same hardware under the control of a hypervisor, and some or all of these operating systems might implement read-copy update (RCU) synchronization, as could the hypervisor itself.

It is further assumed that update operations executed within kernel or user mode processes, threads, or other execution contexts will periodically perform updates on a set of shared data 16 stored in the shared memory 8. For purposes of illustration, it will be assumed that the plural processes concurrently referencing the shared data set 16 include data updater operations ("updaters") $18_1, 18_2 \ldots 18_n$ and data reader operations ("readers") $19_1 \ldots 19_n$, respectively executing on processors $4_2 \ldots 4_n$. As described by way of background above, the updates performed by the data updaters $18_1, 18_2 \ldots 18_n$ can include modifying elements of a linked list, inserting new elements into the list, deleting elements from the list, and many other types of operations. The read operations $19_1 \ldots 19_n$ will typically be performed far more often than updates, insofar as this is one of the premises underlying the use of read-copy update.

Figure 5:
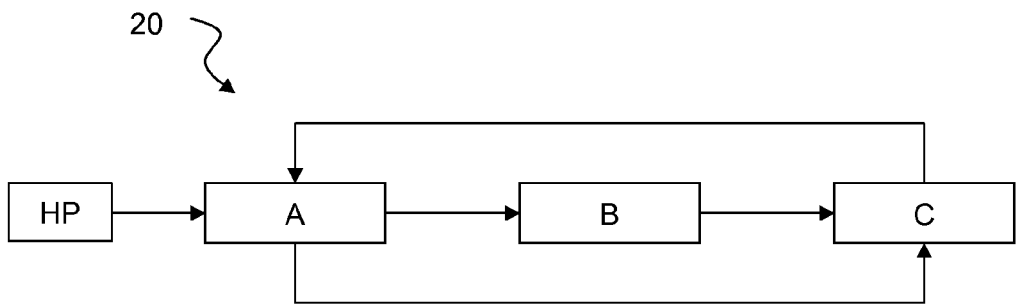
FIG. 5 is a diagrammatic representation of a group of data elements implemented as a cyclic graph that readers traverse by way of cyclic searches.

It is additionally assumed that the shared data set 16 represents a group of data elements that must be updated atomically as a group within a single update operation, so that readers are presented with a consistent view of the data during any given read operation. FIG. 5 illustrates an example of such a data element group in the form of a cyclic graph 20 comprising a linked set of data elements A, B and C. As mentioned by way of background above, these linked data elements can be constituted using any suitable programming construct, including but not limited to C-language "struct" (data structure) variables comprising one or more data fields and one or more pointers to other elements in the data group. During a cyclic search (read operation) involving the graph 20, a reader enters the graph by following the global header pointer HP to element A of the graph. Depending on the processing result generated at A, the reader may either move to B and thence to C, or directly to C. From C, the reader returns to A. It will be seen that if any of the data elements A, B or C is modified or deleted using the conventional read-copy update mechanism, readers will be presented with an inconsistency if they re-encounter the data element or find that it has been removed during the same operation. For example, if the graph 20 is a state machine, the logic of a reader encountering the updated data element may be thrown into disarray, possibly causing the reader to take an erroneous action or crash. An inconsistency problem could also occur if a new data element is added while a read operation is in progress.

Figure 6:
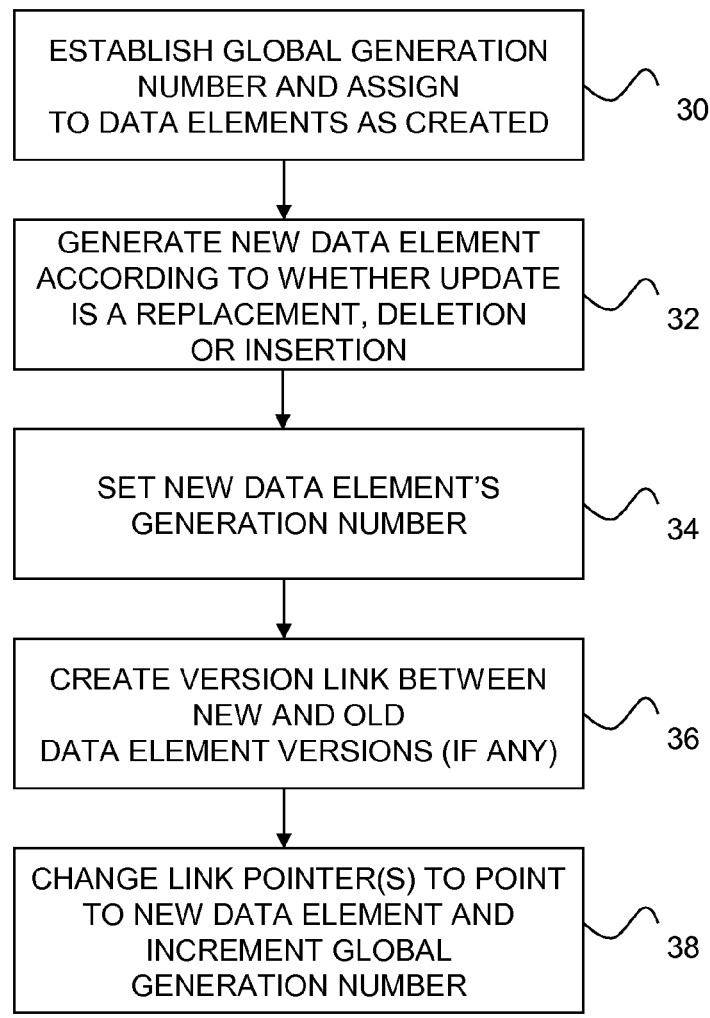
FIG. 6 is a flow diagram showing a generalized prior art method for updating a data element group.

Commonly assigned U.S. Pat. No. 7,426,511 (the '511 patent), referred to above in the section entitled "Background of the Invention," discloses a technique for maintaining group integrity while updating a shared data element group such as the cyclic graph 20. FIG. 6 is illustrative of this prior art technique. In an initialization step 30, a global generation number is established relative to the data element group and each data element in the group is assigned a copy of the global generation number at the time of its creation. In steps 32 and 34, an updater that wishes to replace, delete or insert a group data element generates a new data element, reads the current global generation number, and sets the data element's generation number field to a value that is different (e.g., one greater) than the current global generation number. If the updater is replacing a current data element, the new data element will be a modified copy of the current data element. If the updater is deleting a current data element, the new data element will be a copy of the current data element with a "deleted" flag set. If the updater is inserting a new data element, the new data element is created from scratch. In step 36, the updater sets version links between the new data element and its pre-update version (if such a version exists). Each data element version maintains a set of two version pointers, one being an old-version pointer to a previous version of the data element (if any) and the other being a new-version pointer to a next version of the data element (if any). A NULL old-version pointer is used for any data element having no previous version (i.e., the data element has not been updated since the last grace period or is an insert). A NULL new-version pointer is used for any data element having no next version (i.e., it is the most current version). In step 38, the updater changes any link pointers (group links) that point to the old version of the data element to instead point to the new version, and then updates the global generation number by setting it equal to the generation number of the updated data element. Commonly assigned U.S. Pat. No. 7,953,778 (the '778 patent), also referred to above in the section entitled "Background of the Invention," discloses a similar technique that supports concurrent updaters.

Figure 7:
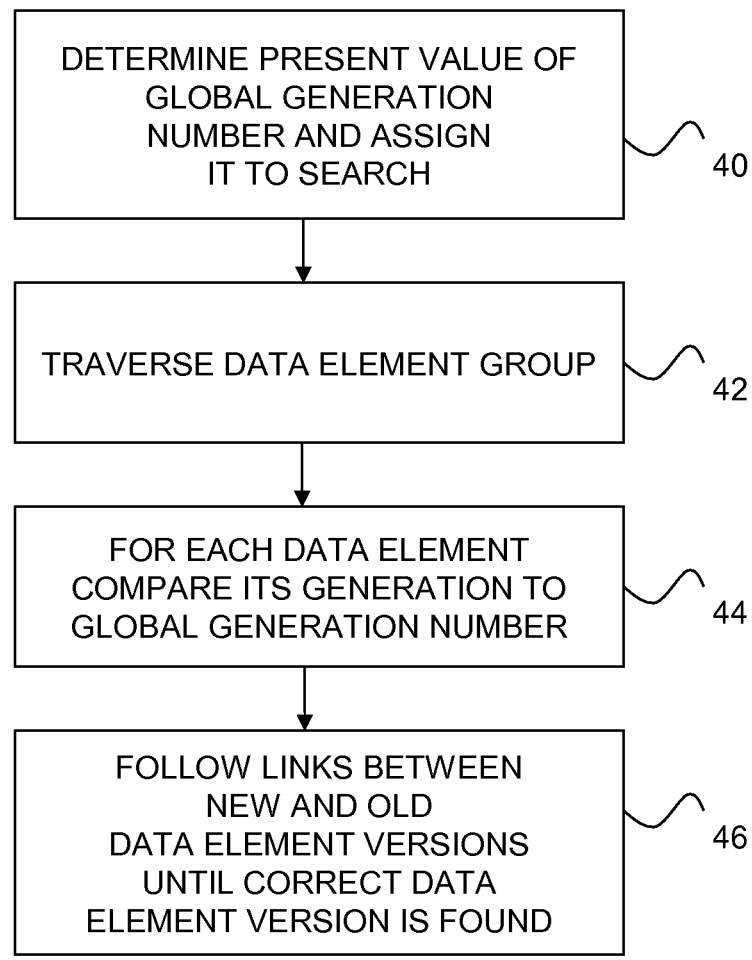
FIG. 7 is a flow diagram showing a generalized prior art method for reading a data element group.

The '511 and '778 patents also disclose a technique that may be employed while searching (reading) a shared data element group such as that shown by the cyclic graph 20. FIG. 7 is illustrative of this prior art technique. In step 40, a reader determines the present value of the global generation number and assigns it to the search. In step 42, the reader traverses the data element group following the links between data elements. In step 44, as each data element is read the reader compares the global generation number assigned to the search with the data element's copy of the global generation number to determine if the two generation numbers match (indicating that the data element is valid for this reader). If the data element's generation number does not match that of the reader, then in step 46, the reader follows the data element's version pointers to new and old versions of the data element, as necessary, to find a version that has a matching generation number, if any. Typically, the reader will choose the data element having the largest generation number that is not greater than the reader's generation number.

As previously stated above in the section entitled "Background of the Invention," the above-described read technique disclosed in the '511 and '778 patents requires either that:
1) Readers execute an explicit memory-barrier instruction after fetching the global generation number, but before traversing the shared data element group; or
2) Updaters wait for a grace period between the update operation and posting the updated global generation number (and updating any header pointers).

Both of these approaches are slow, motivating an improved approach that requires neither read-side memory barriers nor update-side grace periods on the critical read-side or update-side path. A proposed approach is to leverage naturally occurring dependency ordering, so that a reader's normal pointer traversals when entering the data element group automatically provide the minimum required ordering of memory references, and thus the minimum require overhead. A pointer fetch and the subsequent dereferencing thereof to perform a data access is one example of natural dependency ordering. Given proper use of rcu_dereference( ) primitives to carry out the pointer fetch, no CPU or compiler will ever reverse the pointer fetch and dereferencing operations because the fetch operation is a prerequisite to the dereferencing operation. The following alternative embodiments, which are set forth by way of example and not by way of limitation, implement the foregoing dependency ordering strategy:

Embodiment 1

Interpose a generation number element between each header pointer associated with the data element group and the data element referenced by that header pointer, with the generation number element's address serving as the current global generation number;

Embodiment 2

Interpose a generation number element between each header pointer associated with the data element group and the data element referenced by that header pointer, with the generation number element containing the current global generation number; and Embodiment 3

Place the global generation number in the data group element referenced by each header pointer, such that the data group element is also a generation number element. In implementations making use of pointer-forwarding structures (as disclosed in the '511 and '778 patents, the pointer-forwarding structure referenced by each header pointer may take on the role of the generation number element in Embodiment 3.

In each of the Embodiments 1, 2 and 3, it will be seen that a reader will never access the data element group without first deferencing the header pointer and thereby encountering the current global generation number. Readers and updaters do not need to take any explicit actions to ensure proper ordering of the current global generation number fetch and the data element group traversal.

Description of Embodiment 1

Figure 8:
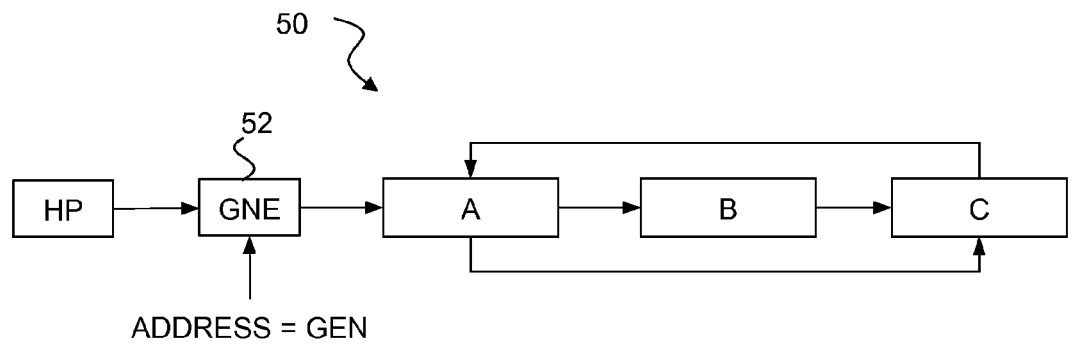
FIG. 8 is a diagrammatic representation of a modified version of the data element group of FIG. 6 in accordance with a first example embodiment.
Figure 9:
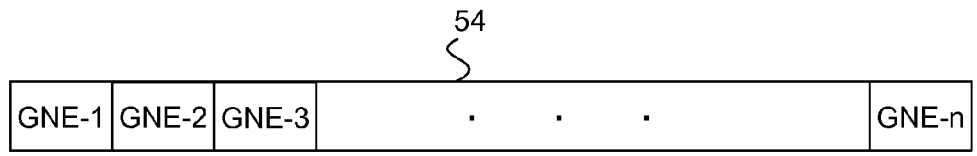
FIG. 9 is a diagrammatic representation of an array that may be used in the first example embodiment.

Embodiment 1 may be understood by reference to FIG. 8, which illustrates a modified version 50 of the cyclic graph 20 shown in FIG. 5. Instead of the header pointer HP directly referencing element A in FIG. 8, the header pointer references a generation number element (GNE) 52, which, in turn, references element A. The generation number element 52 can be implemented as a minimal data element, namely a pointer variable that references element A. As mentioned above, the address of the generation number element 52 serves as the current global generation number, which means that a new generation number element will be generated for each update to the global generation number, with an address value that is higher than the immediately preceding generation number element. One way to accomplish this is to have the generation number elements 52 allocated from a contiguous array, such as the array 54 shown in FIG. 9. One challenge is the case where there are multiple header pointers referencing different elements of the data element group, each of which requires its own generation number element to communicate the current global generation number. This challenge can be surmounted by using aggregate generation number elements, with one sub-element for each header pointer. One example of such an aggregate generation number element would be a C-language "struct" variable with each field thereof representing one sub-element. The elements of the array 54 would be the aggregate generation number elements. An array could also be used to represent an aggregate generation number element. In that case, the array 54 would be a two-dimensional array, with each element thereof itself being an array. Although the address values of each sub-element of a given aggregate generation number element, address arithmetic may be used to obtain the canonical generation number address for such sub-elements given the address of the second or subsequent generation number element. One shortcoming of Embodiment 1 is that the generation number element 52 adds another cache line that must be fetched by the reader, which in turn can degrade reader performance. However, this will not be a problem if the data element group has a tendency to remain resident in CPU caches, which is the case for many repeatedly-searched data structures.

Description of Embodiment 2

Figure 10:
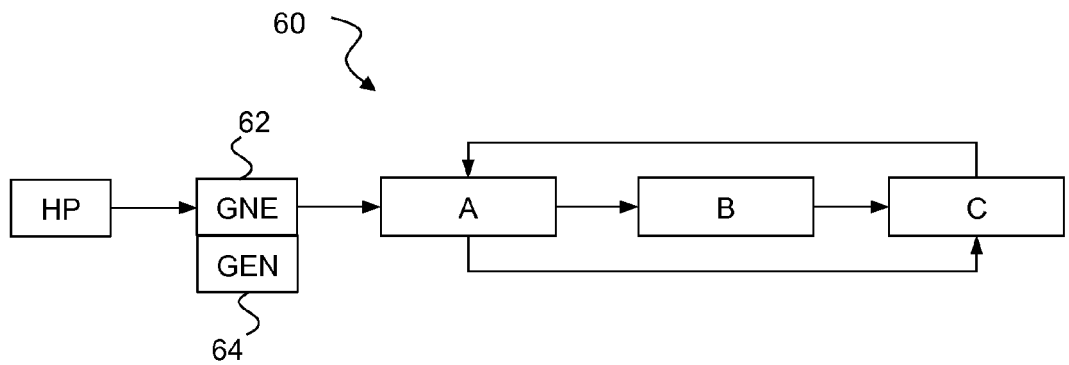
FIG. 10 is a diagrammatic representation of a modified version of the data element group of FIG. 6 in accordance with a second example embodiment.

Embodiment 2 may be understood by reference to FIG. 10, which illustrates a modified version 60 of the cyclic graph 20 shown in FIG. 5. Instead of the header pointer HP directly referencing element A in FIG. 10, the header pointer again references a generation number element (GNE) 62, which, in turn, references element A. If memory space permits (which it usually will, even in an embedded system), the generation number element 62 can be implemented as a small data structure that explicitly stores the current global generation number in a generation number (GEN) data field 64, and also stores a pointer variable that references element A.

It should be noted that dependency ordering does not guarantee that the global generation number will be accessed before the reader begins traversing the remainder of the data element group. The dependency ordering applies only between the header pointer fetch and the access to the global generation number element 64 based on dereferencing the header pointer. Fortunately, ordering between the fetch of the global generation number 64 and access to the remainder of the data element group is not necessary. To see this, consider that any generation number element that provides the global generation number is subject to RCU rules. As described in more detail below, an updater will execute a memory barrier between the time that it establishes the value of the generation number 64 and the time that it stores a reference to the generation number element in the corresponding header pointer HP. In addition, as also described below, any previous version of the generation number element 62 will have been freed from memory following an RCU grace period. This means that for any current RCU reader, there is a one-to-one correspondence between the address of the generation number element 62 and the stored global generation number 64. The CPU might delay the fetch of the global generation number 64, but this is not a problem because a given reader's value for the global generation number is fixed as soon as its fetches the corresponding header pointer HP.

As with Embodiment 1, one shortcoming of Embodiment 2 is that the generation number element 62 adds another cache line that must be fetched by the reader, which in turn can degrade reader performance. However, this will not be a problem if the data element group has a tendency to remain resident in CPU caches, which is the case for many repeatedly-searched data structures.

Description of Embodiment 3

Figure 11:
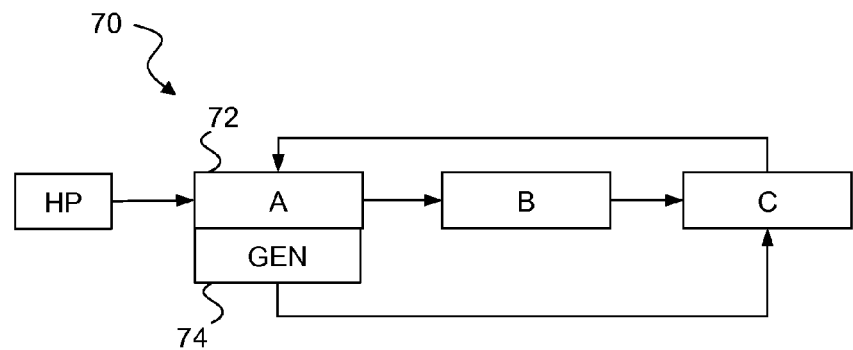
FIG. 11 is a diagrammatic representation of a modified version of the data element group of FIG. 6 in accordance with a third example embodiment.

Embodiment 3 may be understood by reference to FIG. 11, which illustrates a modified version 70 of the cyclic graph 20 shown in FIG. 5. Instead of placing a generation number element between the header pointer HP and element A in FIG. 10, element A serves as a generation number element 72, and stores the current global generation number 74 therein. The header pointer directly references element A. Embodiment 3 dispenses with the need for a separate generation number element, and therefore avoids the need for an extra cache line, as required by Embodiments 1 and 2.

Pointer Forwarding Entities

Figure 12:
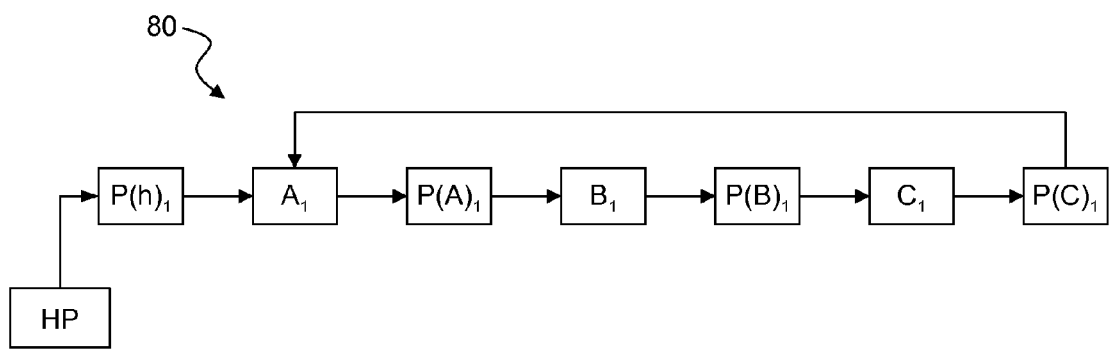
FIG. 12 is a diagrammatic representation of a modified version of the data element group of FIG. 6 in which pointer-forwarding entities are used.

Turning now to FIG. 12, the use of pointer forwarding entities is presented in the context of a circular linked list 80. The linked list 80 comprises three data elements A, B and C, in that order. There is also a global list head pointer forwarding entity P(h) that points to data element A, and three additional pointer forwarding entities P(A), P(B) and P(C) respectively pointing from data elements A, B and C to data elements B, C and A. As described in the '511 patent, pointer-forwarding entities are useful if it is necessary to maintain multiple sets of old/new version pointers, potentially one set for each link pointer that points to a given data element. Each pointer-forwarding entity contains a like pointer to an actual data element, a snapshot of the global generation number that existed with the pointer forwarding element was created, and pointers to old and new versions of that pointer-forwarding entity.

It will be appreciated that Embodiments 1 and 2 may be implemented in the context of FIG. 12 by placing a generation number element (not shown) between the header pointer and the global list head pointer forwarding entity P(h). Embodiment 3 may be implemented in the context of FIG. 12 by using the global list head pointer forwarding entity P(h) to store the current global generation number.

Updater Operation

Updating the cyclic graphs of FIGS. 8-12 will proceed in accordance with FIG. 6, except that step 38 will execute a memory barrier instruction (on systems that require it) prior to updating the current global generation number according to any of Embodiments 1, 2 or 3. For Embodiment 1, the global generation number updating operation will entail creating a new generation number element 52. For Embodiments 2 and 3, the global generation number updating operation will entail updating the global generation number 64 or 74 respectively stored in the existing generation number elements 62 and 72. Each of these update operations will use RCU updating, such that a new version of each generation number element will be created while preserving the old version thereof for the benefit of readers that may still be accessing this element. Step 38 will also include an additional operation for each of Embodiments 1 and 2, namely, updating the header pointers for the data element group to point to the corresponding new or updated generation number element 52 or 62. Finally, step 38 will employ the traditional RCU technique of freeing the old version of the generation number element following a grace period. There may be a single updater, as in the '511 patent, or several concurrent updaters, as in the '788 patent.

Reader Operation

Reading the cyclic graphs of FIGS. 8-12 will proceed in accordance with FIG. 7, except that step 40 will involve deferencing the header pointer HP and accessing the generation number element 52, 62 or 72 to determine the present value of the global generation number. As described above, the address of the global generation number 52 is used as the global generation number for Embodiment 1. For Embodiments 2 and 3, the global generation numbers 64 and 74 are used, respectively.

When a reader traverses the header pointer HP in any of Embodiments 1, 2 and 3, dependency ordering guarantees that the fetch of the global generation number will happen after the header pointer fetch. This ensures that the reader will see the corresponding global generation number rather than pre-initialization garbage. Similarly, dependency ordering guarantees that any fetch of a pointer in the generation number element will happen after the fetch of the header pointer HP. This guarantee chains through successive pointer loads, so that any access anywhere in the linked data structure is guaranteed to happen after the load of the header pointer HP.

Note that the updater's memory barrier guarantees that the corresponding store into the header pointer HP happened after any updates to the data element group. Therefore, the readers are guaranteed to see all updates corresponding to the generation number that they fetched, as required.

Accordingly, a technique has been disclosed for improving the performance of RCU-based searches and updates to a shared data element group where readers must see consistent data with respect to the group as a whole. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIG. 4-12. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 13:
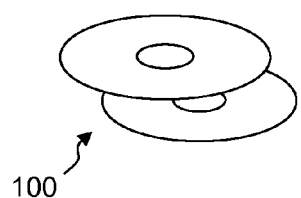
FIG. 13 is a diagrammatic illustration showing media that may be used to provide a computer program product for implementing the technique disclosed herein.

Example data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of storage media that may be used to store the program instructions is shown by reference numeral 100 in FIG. 13. The storage media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions either alone or in conjunction with an operating system or other software product that incorporates the required functionality. The storage media could also be provided by other portable storage media (such as floppy disks, flash memory sticks, etc.), or storage media combined with drive systems (e.g. disk drives). As is the case with the memory 8 and the cache 10 of FIG. 4, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for improving the performance of read-copy update (RCU)-based searches and updates to a shared data element group where readers must see consistent data with respect to the group as a whole, comprising:
   invoking an updater to generate one or more new group data elements;
   assigning each new data element created by the updater a new generation number that is different than a global generation number associated with said data element group and which allows a reader of said data element group to determine whether said new data element is a correct version for said reader;
   performing data element update processing by:
   respectively establishing a first version link that links each of said new data elements to a prior version thereof having a different generation number;
   respectively establishing a second version link that links each of said new data elements from its prior version; and
   respectively establishing group links that link said new data elements into said data element group so that said new data elements are reachable by readers;
   updating said global generation number associated with said data element group so that when all of said updaters have completed said data element update processing, said global generation number will correspond to said new generation number that is associated with said updater;
   said global generation number being updated using a generation number element that is referenced by a header pointer for said data element group and which in turn references or forms part of one of said data elements; and
   respectively freeing said prior version, said first version link, and said second version link for each of said new data elements following a grace period, together with any prior version of said generation number element.

2. The method of claim 1, wherein said generation number element comprises a pointer that references one of said data elements and whose address comprises said global generation number.

3. The method of claim 2, wherein said generation number element is allocated from a contiguous array of generation number elements.

4. The method of claim 1, wherein said generation number element comprises a data structure whose fields include a pointer that references one of said data elements and a variable storing said global generation number.

5. The method of claim 1, wherein said generation number element comprises one of said data elements implemented as a data structure whose fields include a variable storing said global generation number.

6. The method of claim 1, wherein said generation number element comprises a pointer-forwarding entity implemented as a data structure whose fields include a pointer reference to one of said data elements and a variable storing said global generation number.

7. The method of claim 1, wherein said updater executes a memory barrier instruction after establishing said first version link, said second version link and said group links, and prior to updating said global generation number.

8. A system, comprising:
one or more processors;
a memory coupled to said one or more processors, said memory including a computer useable medium tangibly embodying at least one program of instructions executable by said processor to perform operations for improving the performance of read-copy update (RCU)-based searches and updates to a shared data element group where readers must see consistent data with respect to the group as a whole, said operations comprising:
invoking an updater to generate one or more new group data elements;
assigning each new data element created by the updater a new generation number that is different than a global generation number associated with said data element group and which allows a reader of said data element group to determine whether said new data element is a correct version for said reader;
performing data element update processing by:
respectively establishing a first version link that links each of said new data elements to a prior version thereof having a different generation number;
respectively establishing a second version link that links each of said new data elements from its prior version; and
respectively establishing group links that link said new data elements into said data element group so that said new data elements are reachable by readers;
updating said global generation number associated with said data element group so that when all of said updaters have completed said data element update processing, said global generation number will correspond to said new generation number that is associated with said updater;
said global generation number being updated using a generation number element that is referenced by a header pointer for said data element group and which in turn references or forms part of one of said data elements; and
respectively freeing said prior version, said first version link, and said second version link for each of said new data elements following a grace period, together with any prior version of said generation number element.

9. The system of claim 8, wherein said generation number element comprises a pointer that references one of said data elements and whose address comprises said global generation number.

10. The system of claim 9, wherein said generation number element is allocated from a contiguous array of generation number elements.

11. The system of claim 8, wherein said generation number element comprises a data structure whose fields include a pointer that references one of said data elements and a variable storing said global generation number.

12. The system of claim 8, wherein said generation number element comprises one of said data elements implemented as a data structure whose fields include a variable storing said global generation number.

13. The system of claim 8, wherein said generation number element comprises a pointer-forwarding entity implemented as a data structure whose fields include a pointer reference to one of said data elements and a variable storing said global generation number.

14. The system of claim 8, wherein said updater executes a memory barrier instruction after establishing said first version link, said second version link and said group links, and prior to updating said global generation number.

15. A computer program product, comprising:
one or more non-transitory machine-useable storage media;
logic provided by said one or more media for improving the performance of read-copy update (RCU)-based searches and updates to a shared data element group where readers must see consistent data with respect to the group as a whole, as by:
invoking an updater to generate one or more new group data elements;
assigning each new data element created by the updater a new generation number that is different than a global generation number associated with said data element group and which allows a reader of said data element group to determine whether said new data element is a correct version for said reader;
performing data element update processing by:
respectively establishing a first version link that links each of said new data elements to a prior version thereof having a different generation number;
respectively establishing a second version link that links each of said new data elements from its prior version; and
respectively establishing group links that link said new data elements into said data element group so that said new data elements are reachable by readers;
updating said global generation number associated with said data element group so that when all of said updaters have completed said data element update processing, said global generation number will correspond to said new generation number that is associated with said updater;
said global generation number being updated using a generation number element that is referenced by a header pointer for said data element group and which in turn references or forms part of one of said data elements; and
respectively freeing said prior version, said first version link, and said second version link for each of said new data elements following a grace period, together with any prior version of said generation number element.

16. The computer program product of claim 15, wherein said generation number element comprises a pointer that references one of said data elements and whose address comprises said global generation number.

17. The computer program product of claim 16, wherein said generation number element is allocated from a contiguous array of generation number elements.

18. The computer program product of claim 15, wherein said generation number element comprises a data structure whose fields include a pointer that references one of said data elements and a variable storing said global generation number.

19. The computer program product of claim 15, wherein said generation number element comprises one of said data elements implemented as a data structure whose fields include a variable storing said global generation number.

20. The computer program product of claim 15, wherein said generation number element comprises a pointer-forwarding entity implemented as a data structure whose fields include a pointer reference to one of said data elements and a variable storing said global generation number.

21. The computer program product of claim 15, wherein said updater executes a memory barrier instruction after establishing said first version link, said second version link and said group links, and prior to updating said global generation number.

* * * * *